Aug. 21, 1956  G. F. PITTMAN, JR., ET AL  2,760,088

PULSE-SHAPING CIRCUITS

Filed June 8, 1954

WITNESSES

INVENTORS
George F. Pittman, Jr., Richard O. Decker &
Richard L. Bright
BY
ATTORNEY United States Patent Office 2,760,088
Patented Aug. 21, 1956

2,760,088

PULSE-SHAPING CIRCUITS

George F. Pittman, Jr., and Richard O. Decker, Pittsburgh, and Richard L. Bright, Adamsburg, Pa., assignors to Westinghouse Electric Corporation, East Pittsburgh, Pa., a corporation of Pennsylvania Application June 8, 1954, Serial No. 435,212

8 Claims. (Cl. 307—106)

This invention relates to pulse-shaping circuits, and more particularly to pulse-shaping circuits which produce output pulses of constant volt-second area.

In many applications it is necessary to have input pulses of constant volt-second area. For instance, in counter circuits, in order to obtain an accurate indication of the number of input pulses, the input pulses must have a constant volt-second area. However, the prior art pulse-shaping circuits, such as electronic pulse-shaping circuits, do not produce output pulses of constant volt-second area. The reason for this is that any variation in the magnitude of the voltages or currents supplied to the electronic pulse-shaping circuits causes a variation in the volt-second area of their output pulses.

An object of this invention is to provide for producing output pulses of constant volt-second area from input pulses of irregular wave shape, by controlling the saturation of a magnetic core member in one direction in response to the input pulses and then between input pulses resetting the flux level in the magnetic core member to saturation in the other direction.

Another object of this invention is to provide for driving a magnetic core member to saturation in response to an input pulse and then detecting when the magnetic core member saturates to thus initiate a resetting of the flux level in the magnetic core member, to thereby produce an output puse of predetermined volt-second area during that portion of the operation when the magnetic core member is being driven to saturation.

Other objects of this invention will become apparent from the following description taken in conjunction with the accompanying drawing, in which.

Figure 1:
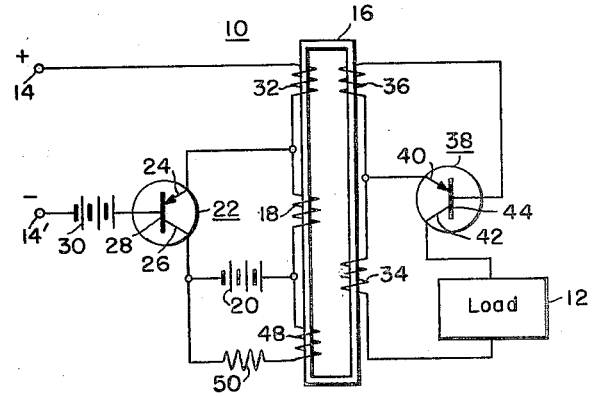
Figure 1 is a schematic diagram of apparatus and circuits illustrating this invention and in which the output circuit is conductively isolated from the input circuit.

Referring to Fig. 1, there is illustrated a pulse-shaping circuit 10 for producing output pulses of constant volt-second area across a load 12 in response to input pulses of irregular wave shape, as applied to input terminals 14 and 14'. In general, the pulse-shaping circuit comprises a magnetic core member 16 which is driven to positive saturation in response to the input pulses, as applied to the input terminals 14 and 14', and which is driven to negative saturation once the magnetic core member 16 reaches saturation in the positive direction. Output pulses of constant volt-second area are produced across the load 12 during that portion of the operation when the magnetic core member 16, which is constructed of rectangular loop core material, is being driven to positive saturation.

In order to drive the magnetic core member 16 to positive saturation, a main winding 18 is disposed in inductive relationship with the magnetic core member 16, the main winding 18 being connected to be energized from a source 20 of direct current when a semiconductive device or transistor 22 is rendered conductive in response to the input pulses, as applied to the terminals 14 and 14'. In this instance, the transistor 22 functions as a switching transistor, and comprises an emitter electrode 24, a collector electrode 26, and a base electrode 28.

In operation, the transistor 22 is rendered conductive when input pulses of greater than a predetermined amplitude, and of a polarity as shown in the drawing, are applied to the input terminals 14 and 14'. The reason the input pulses must be of greater than a predetermined amplitude is that they must overcome the voltage produced by a direct-current bias source 30 which functions to maintain the transistor 22 non-conductive while the magnetic core member 16 is being driven to saturation in the negtive direction. Thus, in operation, the emitter electrode 24 is rendered positive with respect to the base electrode 28 when an input pulse is applied to the input terminals 14 and 14'.

In order to maintain the transistor 22 conductive on termination of the input pulse and until the magnetic core member 16 reaches positive saturation, a holding winding 32 is disposed in inductive relationship with the magnetic core member 16. In practice, the holding winding 32 is so disposed on the magnetic core member 16 that the current flow through the main winding 18, as effected by the source 20, effects an induced voltage across the holding winding 32 of such polarity that the emitter electrode 24 of the transistor 22 is maintained positive with respect to the base electrode 28. Therefore, in operation, the voltage induced across the holding winding 32 must also be of greater amplitude than the voltage produced by the bias source 30.

In the embodiment of Fig. 1, the load 12 is conductively isolated from the input side of the pulse-shaping circuit 10. In particular, the load 12 is energized in accordance with the voltage induced across a load winding 34 while the magnetic core member 16 is being driven to positive saturation by the current flow through the main winding 18.

As illustrated, the load winding 34 is disposed in inductive relationship with the magnetic core member 16. In addition, a holding winding 36 is disposed in inductive relationship with the magnetic core member 16, the load winding 34 and the holding winding 36 being so disposed on the magnetic core member 16 and so interconnected with a switching transistor or semiconductive device 38 and with the load 12 that current only flows through the load 12 when the main winding 18 is energized from the source 20. As was the case with the switching transistor 22, the transistor 38 comprises three electrodes, namely, an emitter electrode 40, a collector electrode 42 and a base electrode 44.

In practice, the voltage induced across the load winding 34 while current flow through the main winding 18, is of rectangular wave shape. The amplitude of the output pulse appearing across the load 12 is determined by the magnitude of the voltage produced by the source 20 and the turns ratio between the main winding 18 and the load winding 34. On the other hand, the width of the output pulse as produced across the load 12 is determined by the magnitude of the voltage produced by the source 20, the characteristics of the main winding 18, and the size of the magnetic core member 16.

In order to drive the magnetic core member 16 to negative saturation once it reaches positive saturation due to the current flow through the main winding 18, a control winding 48 is disposed in inductive relationship with the magnetic core member 16 and is connected to be energized from the source 20. In particular, the control winding 48 is connected in series circuit relationship with a current-limiting resistor 50, the series circuit being connected across the source 20. In practice, the impedance of the current-limiting resistor 50 is such as to minimize the current flow through the control winding 48 when the transistor 22 is conductive and the source 20 is effecting a current flow through the main winding 18. Also in practice, the control winding 48 is so disposed on the magnetic core member 16 that the current flow therethrough produces a flux in the magnetic core member 16 which opposes the flux produced by the current flow through the main winding 18.

The operation of the pulse-shaping circuit 10 will now be described. When an input pulse of a polarity shown is applied to the terminals 14 and 14' the emitter electrode 24 of the transistor 22 is rendered positive with respect to the base electrode 28, thereby rendering the transistor 22 conductive. When the transistor 22 is rendered conductive, in response to the input pulse, the source 20 effects a current flow through the main winding 18 to thereby drive the magnetic core member 16 to positive saturation. In particular, current flows from the right end of the source 20, as illustrated, through the main winding 18, and the emitter and collector electrodes 24 and 26, to the left end of the source 20. Current also flows during this portion of the operation through the control winding 48. However, this current flow is minimized by the current-limiting resistor 50, and thus the current flow through the main winding 18 is able to drive the magnetic core member 16 to positive saturation.

The current flow through the main winding 18 induces a voltage across the holding winding 32 of such amplitude and polarity as to hold the transistor 22 conductive until the magnetic core member 16 saturates in the positive direction. In other words, once the input pulse, applied to the terminals 14 and 14', renders the transistor 22 conductive, the holding winding 32 maintains it conductive until the magnetic core member 16 saturates. As hereinbefore mentioned, the current flow through the main winding 18 also induces a voltage across the load winding 34, this induced voltage being of such polarity that the emitter electrode 40 of the transistor 38 is rendered positive with respect to the collector electrode 42. In addition, the current flow through the main winding 18 induces a voltage across the holding winding 36 of such polarity as to render the emitter electrode 40 positive with respect to the base electrode 44. Such being the case, the transistor 38 is rendered conductive and the induced voltage across the load winding 34, as produced by the current flow through the main winding 18, effects a current flow from the upper end of the load winding 34, as illustrated, through the emitter and collector electrodes 40 and 42, and the load 12, to the lower end of the load winding 34.

When the magnetic core member 16 reaches positive saturation, the voltage appearing across the holding winding 32 is reduced to substantially zero magnitude. This enables the bias source 30 to render the transistor 22 non-conductive. Current then flows through the control winding 48 to thereby drive the magnetic core member 16 to saturation in the negative direction. However, the current flow through the control winding 48 induces a voltage across the holding winding 36 of such polarity as to render the base electrode 44 of the transistor 38 positive with respect to the emitter electrode 40. In addition, the current flow through the control winding 48 induces a voltage across the load winding 34 of such a polarity that the collector electrode 42 of the transistor 38 is rendered positive with respect to the emitter electrode 40. Thus the switching transistor 38 in cooperation with the load and holding windings 34 and 36 prevents output pulses from appearing across the load 12 when the magnetic core member 16 is being driven to negative saturation. Once the magnetic core member 16 reaches negative saturation the next input pulse, applied to the terminals 14 and 14', again renders the transistor 22 conductive and the above described operation is repeated.

Figure 2:
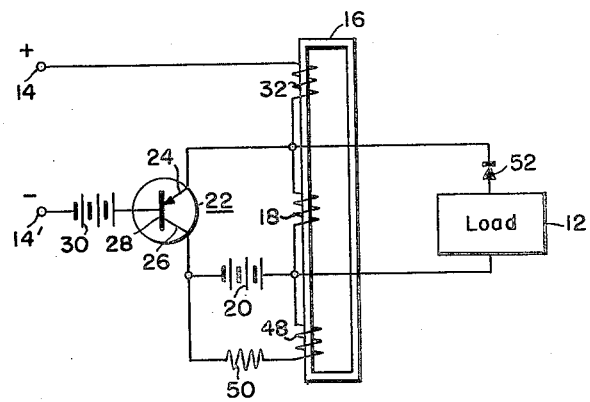
Fig. 2 is a schematic diagram of another embodiment of this invention in which the output circuit is not conductively isolated from the input circuit.

Referring to Fig. 2, there is illustrated another embodiment of this invention in which like components of Figs. 1 and 2 have been given the same reference characters. The main distinction between the apparatus of Figs. 1 and 2 is that in the apparatus of Fig. 2 the load 12 is not conductively isolated from the input side of the pulse-shaping circuit. In particular, the load 12 is connected in series circuit relationship with a one-way rectifier 52, the series circuit being connected across the main winding 18.

In operation, when an input pulse, applied to the terminals 14 and 14', renders the transistor 22 conductive, current flows from the right end of the source 20, as illustrated, through the main winding 18, and the emitter and collector electrodes 24 and 26 of the transistor 22, to the left end of the source 20. At the same time, current also flows through the load 12 and the one-way rectifier 52, in the forward direction. Thus, while current is flowing through the main winding 18 of the pulse shaping circuit of Fig. 2 an output pulse of predetermined volt-second area is produced across the load 12.

During that portion of the operation when the source 20 effects a current flow through the control winding 48, to thereby drive the magnetic core member 16 to negative saturation, the one-way rectifier 52 prevents the voltage induced across the main winding 18 from effecting a current through the load 12. Since the remaining operation of the apparatus of Fig. 2 is similar to the operation of the apparatus of Fig. 1, a further description of such operation is deemed unnecessary.

Figure 3:
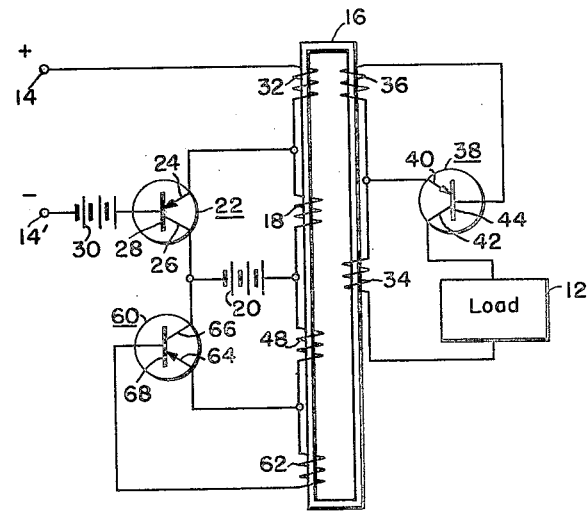
Fig. 3 is a schematic diagram of still another embodiment of this invention in which means are provided for rendering more independent the two parts of the cycle of operation.

Referring to Fig. 3, there is illustrated still another embodiment of this invention in which like components of Figs. 1 and 3 have been given the same reference characters. The main distinction between the apparatus of Figs. 1 and 3 is that in the apparatus of Fig. 3 substantially no current flows through the control winding 48 during that portion of the operation when current is flowing through the main winding 18. This is accomplished by means of a switching transistor or semiconductive device 60 and its associated holding winding 62 which is disposed in inductive relationship with the magnetic core member 16. In particular, the holding winding 62 is so disposed on the magnetic core member 16 that when current flows through the main winding 18 a voltage is induced across the holding winding 62 to maintain the switching transistor 60 non-conductive, thus preventing the source 20 from effecting a flow of current through the control winding 48. As illustrated, the switching transistor 60 comprises an emitter electrode 64, a collector electrode 66, and a base electrode 68.

In operation, an input pulse applied to the terminals 14 and 14' renders the transistor 22 conductive thereby effecting a flow of current through the main winding 18. The flow of current through the main winding 18 drives the magnetic core member 16 to positive saturation, thereby producing a pulse of predetermined voltage second area across the load 12. However, in addition, the current flow through the main winding 18 effects an induced voltage across the holding winding 62 of such polarity that the base electrode 68 of the transistor 60 is rendered positive with respect to the emitter electrode 64, thereby preventing a flow of current through the control winding 48.

Once the magnetic core member 16 reaches positive saturation the voltage across the holding winding 32 is reduced to zero magnitude, thereby rendering the transistor 22 non-conductive and thus the flow of current through the main winding 18. However, on reaching positive saturation of the magnetic core member 16, there is a reversal of the polarity of the voltage across the holding winding 62, to thereby render the emitter electrode 64 of the transistor 60 positive with respect to the base electrode 68. Such an action renders the transistor 60 conductive and thus current flows from the right end of the source 20, as illustrated, through the control winding 48, and the emitter and collector electrodes 64 and 66 of the transistor 60, to the left end of the source 20. The current flow through the control winding 48 effects a driving of the magnetic core member 16 to negative saturation. However, in addition, the current flow through the control winding 48 effects an induced voltage across the holding winding 62 of such polarity as to render the emitter electrode 64 positive with respect to the base electrode 68. This holds the transistor 60 conductive until negative saturation of the magnetic core member 16 is reached. The above-described cycle of operation is then repeated. Since the remaining operation of the apparatus of Fig. 3 is similar to the operation of the apparatus of Fig. 1, a further description of such operation is deemed unnecessary.

The apparatus embodying the teaching of this invention has several advantages. For instance, even though the magnitude of the voltage produced by the sources 20 and 30 varies, still the various pulse-shaping circuits illustrated herein produce output pulses of constant volt-second area. In addition, each of the pulse-shaping circuits illustrated herein comprises static components. Thus, maintenance of these pulse-shaping circuits is held to a minimum. Further, the pulse-shaping circuits embodying this invention are of rugged construction. This also minimizes maintenance problems.

It is to be understood that any of the transistors shown herein can be connected in the grounded base connection or in the inverted connection or in other known connections by making minor variation as is well known in the art.

Since numerous changes may be made in the above described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a pulse-shaping circuit for supplying pulses of constant volt-second area to a load in response to input pulses, the combination comprising, a magnetic core member, a semi-conductive device, winding means disposed in inductive relationship with the magnetic core member and connected to be energized from a source of direct current when the semiconductive device is rendered conductive to thereby drive the magnetic core member to saturation in the positive direction, circuit means for rendering the semi-conductive device conductive in response to said input pulses and for holding the semiconductive device conductive until the magnetic core member saturates in the positive direction, the winding means also being connected to be energized by the source of direct current when the magnetic core member saturates in the positive direction, to thereby drive the magnetic core member to saturation in the negative direction, and other circuit means for connecting said load so as to be energized in accordance with the change in flux in the magnetic core member.

2. In a pulse shaping circuit for supplying pulses of constant volt-second area to a load in response to input pulses, the combination comprising, a magnetic core member, a semiconductive device, a main winding disposed in inductive relationship with the magnetic core member and connected to be energized from a source of direct current when the semiconductive device is rendered conductive, a holding winding disposed in inductive relationship with the magnetic core member, circuit means for rendering the semiconductive device conductive in response to said input pulses, the holding winding being so interconnected with the semi-conductive device as to hold the semiconductive device conductive while the main winding is energized, a control winding disposed in inductive relationship with the magnetic core member, the control winding being connected to be energized by the source of direct current when the magnetic core member saturates, to thereby drive the magnetic core member away from saturation, and other circuit means for connecting said load so as to be energized in accordance with the change in flux in the magnetic core member.

3. In a pulse-shaping circuit for supplying pulses of constant volt-second area to a load in response to input pulses, the combination comprising, a magnetic core member, a semiconductive device, a main winding disposed in inductive relationship with the magnetic core member and connected to be energized from a source of direct current when the semiconductive device is rendered conductive, circuit means for rendering the semiconductive device conductive in response to said input pulses and for holding the semiconductive device conductive until the magnetic core member saturates, a control winding disposed in inductive relationship with the magnetic core member, the control winding being connected to be energized by the source of direct current once the magnetic core member saturates, to thereby drive the magnetic core member away from saturation, and a load winding disposed in inductive relationship with the magnetic core member, said load being interconnected with the load winding so as to be energized in accordance with the change in flux in the magnetic core member.

4. In a pulse-shaping circuit for supplying pulses of constant volt-second area to a load in response to input pulses, the combination comprising, a magnetic core member, a semiconductive device, a main winding disposed in inductive relationship with the magnetic core member and connected to be energized from a source of direct current when the semiconductive device is rendered conductive, circuit means for rendering the semiconductive device conductive in response to said input pulses and for holding the semiconductive device conductive until the magnetic core member saturates, a control winding disposed in inductive relationship with the magnetic core member, the control winding being connected to be energized by the source of direct current once the magnetic core member saturates, to thereby drive the magnetic core member away from saturation, a load winding disposed in inductive relationship with the magnetic core member, a holding winding disposed in inductive relationship with the magnetic core member, and another semiconductive device, the load winding and the holding winding being so disposed on the magnetic core member and so interconnected with said load and with said another semiconductive device that current only flows through the said load when the main winding is energized.

5. In a pulse-shaping circuit for supplying pulses of constant volt-second area to a load in response to input pulses, the combination comprising, a magnetic core member, a semiconductive device, a main winding disposed in inductive relationship with the magnetic core member and connected to be energized from a source of direct current when the semiconductive device is rendered conductive, circuit means for rendering the semiconductive device conductive in response to said input pulses and for holding the semiconductive device conductive until the magnetic core member saturates, a control winding disposed in inductive relationship with the magnetic core member, the control winding being connected to be energized by the source of direct current once the magnetic core member saturates, to thereby drive the magnetic core member away from saturation, and a series circuit including a one-way rectifier and said load, the series circuit being so connected in parallel circuit relationship with the main winding that current flows through the said load only when the semiconductive device is conductive.

6. In a pulse-shaping circuit for supplying pulses of constant volt-second area to a load in response to input pulses, the combination comprising, a magnetic core member, a semiconductive device comprising three electrodes, a main winding disposed in inductive relationship with the magnetic core member and disposed to be energized from a source of direct current, the main winding, the source of direct current, and two of the three electrodes of the semiconductive device being connected in series circuit relationship with one another, whereby when the semiconductive device is rendered conductive current flows through the main winding to drive the magnetic core member to saturation, a holding winding disposed in inductive relationship with the magnetic core member, circuit means, interconnected with the holding winding and with the other of the three electrodes and with one of said two of the three electrodes, for rendering the semiconductive device conductive in response to said input pulses, the voltage induced across the holding winding by the current flow through the main winding being such as to hold the semiconductive device conductive until the magnetic core member saturates, a control winding disposed in inductive relationship with the magnetic core member, further circuit means for connecting the control winding across the source of direct current, whereby the source of direct current effects a driving of the magnetic core member away from saturation once the semiconductive device becomes non-conductive, and other circuit means for connecting said load so as to be energized in accordance with the change in flux in the magnetic core member.

7. In a pulse-shaping circuit for supplying pulses of constant volt-second area to a load in response to input pulses, the combination comprising, a magnetic core member, a semiconductive device comprising three electrodes, a main winding disposed in inductive relationship with the magnetic core member and disposed to be energized from a source of direct current, the main winding, the source of direct current, and two of the three electrodes of the semiconductive device being connected in series circuit relationship with one another, whereby when the semiconductive device is rendered conductive current flows through the main winding to drive the magnetic core member to positive saturation, a holding winding disposed in inductive relationship with the magnetic core member, circuit means, interconnected with the holding winding and with the other of the three electrodes and with one of said two of the three electrodes, for rendering the semiconductive device conductive in response to said input pulses, the voltage induced across the holding winding by the current flow through the main winding being such as to hold the semiconductive device conductive until the magnetic core member saturates, a control winding disposed in inductive relationship with the magnetic core member, further circuit means including another semiconductive device for connecting the control winding in conductive relationship with the source of direct current once the magnetic core member saturates, whereby the source of direct current effects a driving of the magnetic core member to negative saturation, another holding winding disposed in inductive relationship with the magnetic core member, said another holding winding being so interconnected with said another semiconductive device that the said another semiconductive device is held conductive while the control winding effects a driving of the magnetic core member to negative saturation, and other circuit means for connecting said load so as to be energized in accordance with the change in flux in the magnetic core member.

8. In a pulse-shaping circuit for supplying pulses of constant volt-second area to a load in response to input pulses, the combination comprising, a magnetic core member, a semiconductive device comprising three electrodes, a main winding disposed in inductive relationship with the magnetic core member and disposed to be energized from a source of direct current, the main winding, the source of direct current, and two of the three electrodes of the semiconductive device being connected in series circuit relationship with one another, whereby when the semiconductive device is rendered conductive current flows through the main winding to drive the magnetic core member to positive saturation, a holding winding disposed in inductive relationship with the magnetic core member, circuit means, interconnected with the holding winding and with the other of the three electrodes and with one of said two of the three electrodes, for rendering the semiconductive device conductive in response to said input pulses, the voltage induced across the holding winding by the current flow through the main winding being such as to hold the semiconductive device conductive until the magnetic core member saturates, a control winding disposed in inductive relationship with the magnetic core member, further circuit means including another semiconductive device for connecting the control winding in conductive relationship with the source of direct current once the magnetic core member saturates, whereby the source of direct current effects a driving of the magnetic core member to negative saturation, another holding winding disposed in inductive relationship with the magnetic core member, said another holding winding being so interconnected with said another semiconductive device that the said another semiconductive device is held conductive while the control winding effects a driving of the magnetic core member to negative saturation, and a load winding disposed in inductive relationship with the magnetic core member, said load being so interconnected with the load winding as to be energized only when the main winding is conducting current.

No references cited.